(12) United States Patent
Gardner et al.

(10) Patent No.: US 6,580,751 B1
(45) Date of Patent: Jun. 17, 2003

(54) HIGH SPEED DOWNHOLE COMMUNICATIONS NETWORK HAVING POINT TO MULTI-POINT ORTHOGONAL FREQUENCY DIVISION MULTIPLEXING

(75) Inventors: Wallace R. Gardner, Houston, TX (US); John W. Minear, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 09/496,077

(22) Filed: Feb. 1, 2000

(51) Int. Cl.[7] ................................................. H04B 1/38
(52) U.S. Cl. ..................... 375/222; 375/258; 375/356
(58) Field of Search ................................. 375/222, 225, 375/231, 260, 356, 362, 354, 257, 258; 370/431, 480, 508; 367/25; 166/250.1

(56) References Cited

U.S. PATENT DOCUMENTS

| | | | |
|---|---|---|---|
| 3,990,036 A | 11/1976 | Savit ........................ 340/15.5 |
| 4,676,313 A | 6/1987 | Rinaldi ........................ 166/252 |
| 4,694,453 A * | 9/1987 | Kobayashi et al. ......... 370/249 |
| 4,986,350 A | 1/1991 | Czernichow ............... 166/65.1 |
| 5,105,391 A | 4/1992 | Rice et al. ..................... 367/58 |
| 5,148,144 A * | 9/1992 | Sutterlin et al. ........ 340/310.01 |
| 5,285,474 A * | 2/1994 | Chow et al. ................. 375/231 |
| 5,461,594 A | 10/1995 | Mougenot et al. ............ 367/48 |
| 5,467,823 A | 11/1995 | Babour et al. ......... 166/250.01 |
| 5,597,042 A | 1/1997 | Tubel et al. ........... 166/250.01 |
| 5,644,573 A | 7/1997 | Bingham et al. ........... 370/503 |
| 5,662,165 A | 9/1997 | Tubel et al. ........... 166/250.01 |
| 5,724,311 A | 3/1998 | Laurent et al. ................ 367/57 |
| 5,730,219 A * | 3/1998 | Tubel et al. .............. 166/250.1 |
| 5,751,741 A * | 5/1998 | Voith et al. .................. 714/758 |
| 5,903,608 A | 5/1999 | Tailliet ........................ 375/260 |
| 5,933,454 A * | 8/1999 | Cioffi ......................... 375/260 |
| 5,947,199 A | 9/1999 | Havig .................... 166/250.01 |
| 5,978,317 A | 11/1999 | Whitener ..................... 367/178 |
| 5,992,519 A | 11/1999 | Ramakrishnan et al. ...................... 166/250.15 |
| 6,005,893 A | 12/1999 | Hyll ............................ 375/260 |
| 6,006,832 A | 12/1999 | Tubel et al. .......... 166/250.021 |
| 6,035,000 A * | 3/2000 | Bingham ..................... 375/296 |
| 6,219,378 B1 * | 4/2001 | Wu .............................. 375/231 |
| 6,259,258 B1 * | 7/2001 | Cook et al. .................. 324/628 |

OTHER PUBLICATIONS

MacMillan Technology Series; "ADSL/VDSL Principles; A Practical and Precise Study of Asymmetric Digital Subscriber Lines and Very High Speed Digital Subscriber Lines" by Dr. Dennis J. Rauschmayer; MacMillan Technical Publishing, 1998.

* cited by examiner

*Primary Examiner*—Stephen Chin
*Assistant Examiner*—Chieh M. Fan
(74) *Attorney, Agent, or Firm*—Conley Rose, P.C.; Mark E. Scott

(57) ABSTRACT

A method and related apparatus for high speed digital data communications from multiple distributed modems to a single central modem or a common transmission medium. In one embodiment, multiple downhole modems, with each modem associated with a geophone, transmit data to a surface modem over a single transmission medium. In a second embodiment, multiple transmission mediums are used and a plurality of downhole modems associated with geophones communicate to the surface modem over the downhole modem's respective transmission medium.

15 Claims, 11 Drawing Sheets

| BIN 1 | BIN 2 | BIN 3 | BIN 4 | ... | N-1 | BIN N |
|---|---|---|---|---|---|---|
| 0 | DATA | DATA | 0 | 0 | 0 | 0 |

*FIG.5*

| BIN 1 | BIN 2 | BIN 3 | BIN 4 | ... | N-1 | BIN N |
|---|---|---|---|---|---|---|
| 0 | SCRAMBLED DATA | SCRAMBLED DATA | 0 | 0 | 0 | 0 |

*FIG.6*

| BIN 1 | BIN 2 | BIN 3 | BIN 4 | ... | N-1 | BIN N |
|---|---|---|---|---|---|---|
| 0 | SCRAMBLED DATA (16) | FEC (18) | 0 | 0 | 0 | 0 |

*FIG.7*

HIGH SPEED DOWNHOLE COMMUNICATIONS NETWORK HAVING POINT TO MULTI-POINT ORTHOGONAL FREQUENCY DIVISION MULTIPLEXING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to high speed digital data communications for use in downhole telemetry. More specifically, the invention relates to a communication scheme for transferring data from downhole sensors to surface computers. More specifically still, the invention relates to multiple modems transmitting data to a single central modem where each of the multiple modems communicates to the central modem in an allocated band of frequencies of an overall bandwidth of a communication channel.

2. Background of the Invention

Information is the key to being profitable in the oil and gas industry. The more information one has regarding location and migration patterns of hydrocarbons within a hydrocarbon reservoir, the more likely it is that that reservoir can be tapped at its optimal location and utilized to its full potential.

One mechanism for obtaining information about hydrocarbon reservoirs is the use of seismic imaging. Classic seismic imaging involves stringing hundreds of listening devices, or geophones, over the surface of the Earth near a location where a characteristic picture of the underground formations is desired. Geophones measure both compressional and shear waves directly and they include particle velocity detectors. Geophones typically provide three-component velocity measurement. Geophones can be used to determine the direction of arrival of incident elastic waves. Once these geophones are strategically placed on the surface of the Earth, a seismic disturbance is created which creates traveling waves through the Earth's crust. As these traveling waves encounter boundaries of strata having varying densities, portions of the traveling wave reflect back to the surface. These varying density stratas may include changes in strata components as well as varying densities encountered at boundaries of hydrocarbon reservoirs. By measuring the propagation time, amplitude and direction of reflected waves as they reach the surface, a three-dimensional representation of the formations lying below the surface of the Earth can be constructed.

After a particular hydrocarbon formation is found, the need for information is not alleviated. Once a hydrocarbon reservoir is tapped, the goal becomes removing as much of the hydrocarbons from the reservoir as possible. Here again, the more information one has about the locations of hydrocarbons within the reservoir over the course of time, the more likely the hydrocarbons contained in the reservoir can be fully extracted at the lowest possible cost. Having multiple three-dimensional seismic representations of conditions below the surface over time is typically referred to as four-dimensional (4D) seismic imaging. In early implementations, four-dimensional seismic was created by performing multiple three-dimensional seismic images of the strata or hydrocarbon reservoir in question. However, obtaining four-dimensional seismic representations of underground hydrocarbon reservoirs in this manner has its problems. For instance, the time period for taking readings to determine migration patterns of the hydrocarbons may be as long as years. That is, a single three-dimensional seismic reading may be taken once a year over the course of several years to obtain the four-dimensional seismic image. Each time this three-dimensional seismic image is taken, miles of cables containing geophones must be laid on the surface of the Earth. It is almost impossible to lay these cables in exactly the same location between each three-dimensional imaging session and further, even if the cables are placed relatively close to their locations from previous measurements, the geophones within the cable themselves may not be physically located the same as in previous three-dimensional images.

One way to combat these problems is to place the geophones vertically instead of horizontally. Rather than stretching cables across the surface of the Earth to place the geophones in a relatively horizontal position, the geophones themselves are semi-permanently lowered into well bores such that they are oriented vertically with respect to the surface of the Earth. The well bore into which the geophones may be lowered could be, for example, an existing oil or gas well or may be a well bore dedicated to sensor installation. While permanent placement of the geophones. in a well bore may solve the placement problem for four-dimensional seismic imaging, new problems arise.

Given that seismic imaging fundamentally is measuring the arrival time of reflected waves at one location relative to arrival of reflected waves at another location, knowing the arrival time of all reflected waves relative to each other is critical to the computationally heavy burden of reconstructing an image of the below ground structures over time. To accomplish this task, large quantities of information must be recorded, substantially simultaneously, to correlate the arrival time of the various reflected waves. For traditional 3D seismic operations, whose sensors are simply laidon the surface of the Earth, having sufficient physical space necessary to communicate with each geophone is not a concern. For example, each geophone may have a single twisted pair cable, dedicated just to that geophone, coupled to a computer such that the computer can read each geophone substantially simultaneously. However, when permanently installing geophones in a vertical orientation in a well bore, physical space is not in abundance and therefore having a dedicated twisted pair cable for each geophone may not be feasible. Indeed, having a cable with a dedicated twisted pair for each geophone in a vertically oriented system, which may have assmany as two hundred geophones, may require more cable cross-sectional area than the borehole itself.

For these reasons it would be desirable to have a communication technique that could support communication to the number of geophones necessary for 4D seismic imaging without unnecessarily large communication cables.

BRIEF SUMMARY OF THE INVENTION

The problems noted above are solved in large part by a communication system that uses a modified orthogonal frequency division multiplexing scheme to divide the available bandwidth of each twisted pair cable into discrete frequency bands or sub-channels. Each downhole sensor has associated with it a modem capable of communicating over any of the discrete frequency sub-channels; however, each downhole modem is allocated only a few of the discrete frequency sub-channels such that each downhole modem associated with a seismic sensor can communicate substantially simultaneously to a surface modem. Data is sent to the surface in super-frames created by a group downhole modems each transmitting data on its allocated frequencies in a shared frame period. The information transmitted by each downhole modem in its allocated frequencies within the frame period arrives at the surface modem and combines to form a super-frame, and the surface modem discriminates and decodes the information. The super-frame created by the downhole modems is a modification of the super-frame created by the Assymetrical Digital Subscriber Line (ADSL) standard for data framing, which applies only to point to point communications.

In one embodiment, a single twisted pair cable communicates to as many as two hundred downhole modems associated with seismic sensors. Using these discrete frequency sub-channels for data communication from the downhole modems to the surface modem, a combined data rate of about 6 to 8 megabits per second can be communicated up hole. By compressing data downhole and having all the downhole modems communicate over a single twisted-pair cable, the desired data rates for 4D seismic, which exceed 30 megabits per second, can be achieved.

In a second embodiment, no data compression is used. Instead, five twisted pair cables are grouped into a single overall cable. Each single twisted pair in the group is preferably associated with approximately forty downhole sensors and, since each single twisted pair can carry approximately 6–8 megabits per second, the overall data transmission rate for the five twisted pair cables exceeds the 4D seismic data transmission rate of about 30 megabits per second.

BRIEF DESCRIPTION OF THE DRAWINGS

For a detailed description of the preferred embodiments of the invention, reference will now be made to the accompanying drawings in which:

FIG. 5 shows an exemplary bin transmission distribution of a particular subsurface modem within the upstream band;

FIG. 6 shows data scrambling by one subsurface modem within its allocated sub-channels;

FIG. 7 shows an exemplary sub-frame having scrambled data within its allocated bins and a forward error correction symbol appended thereto;

NOTATION AND NOMENCLATURE

Figure 1:
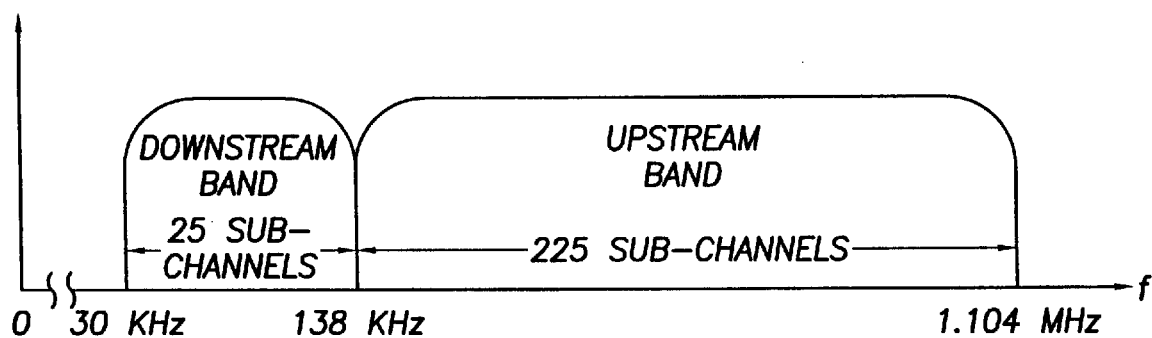
FIG. 1 shows an exemplary distribution of upstream and downstream channels across the available bandwidth of a twisted pair cable.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but hot limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections. The terms upstream and downstream refer generally, in the context of this disclosure, to the transmission of information from subsurface equipment to surface equipment, and from surface equipment to subsurface equipment, respectively. Additionally, the terms surface and subsurface are relative terms. The fact that a particular piece of hardware is described as being on the surface does not necessarily mean it must be physically above the surface of the Earth; but rather, describes only the relative location of the surface and subsurface pieces of equipment.

CATALOGUE OF ELEMENTS

As an aid to correlating the terms of the claims to the exemplary drawings, the following catalog of elements is provided:

| | |
|---|---|
| 10 | ideal loop gain |
| 12 | typical loop gain |
| 14 | line impairments |
| 16 | scrambled data within a subframe |
| 18 | FEC symbols |
| 20 | cyclic prefix |
| 22 | cyclic suffix |
| 24 | data framer for upstream transmitter |
| 26 | CRC block |
| 28 | scrambler logic for upstream transmitter |
| 30 | Reed-Solomon encoder |
| 32 | interleave block for upstream transmitter |
| 34 | tone order and constellation encoder |
| 36 | IDFT for upstream transmitter |
| 38 | DAC for upstream transmitter |
| 40 | shaping filter |
| 50 | ADC for surface receiver |
| 52 | time domain equalization |
| 54 | cyclic prefix/suffix strip block |
| 56 | DFT demodulation |

-continued

| | |
|---|---|
| 58 | QAM decoder |
| 60 | de-interleaver |
| 62 | Reed-Solomon decoder |
| 64 | descrambler |
| 66 | CRC |
| 68 | data framer |
| 70 | line coupling transformer |
| 72 | primary winding |
| 74 | secondary winding |
| 76 | secondary winding |
| 78 | receive isolation transformer |
| 80 | twisted pair cable |
| 81 | ground isolation transformer |
| 100 | surface power source |
| 102 | power line |
| 104 | first cable bundle |
| 106 | 18 gauge wire |
| 120 | surface computer |
| 122 | surface modem |
| 124 | transmit portion of element 122 |
| 126 | receive portion of element 122 |
| 128 | geophone |
| 130 | subsurface modem |
| 132 | cable terminator |
| 150 | surface modem node N |
| 152 | surface modem node N+1 |
| 154 | surface modem node N+X |
| 156 | transmitter |
| 158 | transmitter |
| 160 | transmitter |
| 162 | receiver |
| 164 | transmitter |
| 166 | receiver |
| 168 | subsurface modem node N |
| 170 | subsurface modem node N+1 |
| 172 | subsurface mode node N+X |
| 174 | transmission line coupler node N |
| 176 | receive line coupler node N |
| 178 | transmission line coupler node N+1 |
| 180 | receive line coupler node N+1 |
| 182 | transmission line coupler node N+X |
| 184 | receive line coupler node N+X |
| 186 | line terminator |
| 201 | first quadrant |
| 202 | second quadrant |
| 203 | third quadrant |
| 204 | fourth quadrant |
| 300 | activation and acknowledge |
| 302 | transceiver training |
| 304 | channel analysis |
| 306 | exchange phase |

DETAILED DESCRIPTION OF THE PREFERRED EMBODIMENTS

The present invention is a point to multipoint communication scheme where the available bandwidth of a transmission medium is divided into discrete frequencies. Each discrete frequency has information encoded therein by orthogonal waveforms. Communications to the central point from the multiple outer points are over assigned frequencies. Thus, this specification discloses a system having point to multipoint orthogonal frequency division multiplexing communication scheme.

The available bandwidth for a long twisted pair cable extends in frequency to approximately 1.104 MHz. As in Asymmetrical Digital Subscriber Line (ADSL), the available bandwidth of the present system is preferably divided into sub-channels 4.3125 kHz wide, giving 256 possible sub-channels in the 1.104 MHz bandwidth. Traditional ADSL reserves the first sub-channel (from 0–4 kHz) for audio telephone signals; however, in applications such as communicating with multiple downhole modems associated with permanently installed geophones; there may not be a need for an audio band. Systems with audio bands typically have a guard band separating the sub-channels for communication from the traditional telephone service band. This guard band too may not be needed if an audio band is not required for a particular installation.

For use in communicating to seismic sensors located within a borehole, the sub-channels are preferably divided into an upstream band and a downstream band preferably having more of the available channels, if not all, allocated to the upstream band since it is in this band that each of the subsurface modems communicates seismic data to the surface modem. FIG. 1 shows an exemplary distribution of upstream and downstream channels across the available bandwidth of a twisted pair cable. In the exemplary distribution shown, the upstream band dominates the overall bandwidth having 225 sub-channels. This particular sub-channel distribution has an audio band (not specifically shown) and guard band (not specifically shown). However, as previously mentioned, the audio band and guard band need not be preserved if the particular application does not require a voice band communication channel, as is preferably the case when using the communication system in a 4D seismic detection system.

Figure 2:
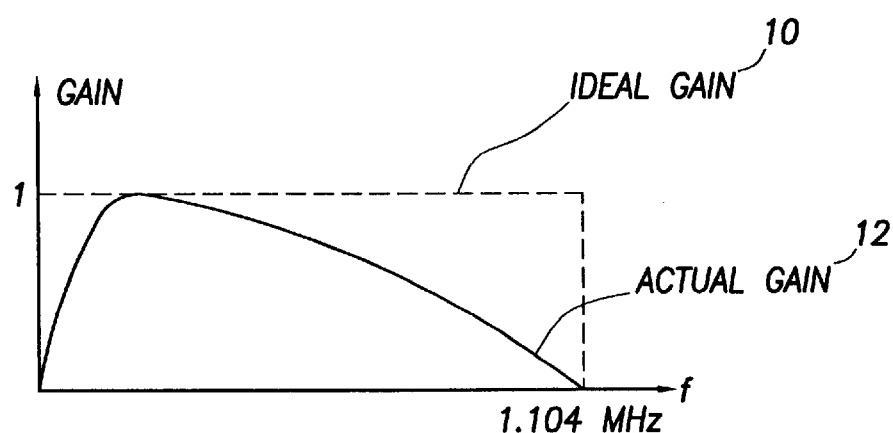
FIG. 2 shows a plot of ideal twisted pair loop gain and actual twisted pair cable loop gain.

In the ideal case, each frequency sub-channel, or bin, would have the same data transmission rate as all the other frequency sub-channels. However, the data rate for each sub-channel varies for a myriad of reasons. For example, interference in a particular frequency may affect certain sub-channels whose frequency is at or near the frequency of the noise source. In this instance, those sub-channels with frequencies about the same as the noise source have lower signal to noise ratios and therefore their data carrying capacity is lower than other channels. In addition to interference from outside sources, the twisted pair cable itself may have an affect on the data carrying capacity of each sub-channel. FIG. 2 shows a plot as a function of frequency of an ideal twisted pair cable loop gain 10, shown with a dashed line, and also shows a plot of a more typical loop gain 12 for a twisted pair cable, shown with a solid line. One of ordinary skill in the art will realize a twisted pair cable cannot increase actual signal strength as data moves across it, but rather, gain in this instance is the reciprocal of the attenuation. On the lower end of the frequency spectrum, the resistance of the twisted pair cable causes signal loss for low frequency signals thereby decreasing the signal to noise ratio and consequently decreasing the loop gain and data rate of the channels at the lower end of the frequency range. As the frequencies of the sub-channels increase, the data rates increase; however, at some point in the bandwidth, the data transmission rate capability begins to drop based on the capacitive effect of the twisted pair cable. Therefore, the data transmission rate for each channel in the bandwidth of the twisted pair cable may vary depending on the frequency of the signal.

Figure 3:
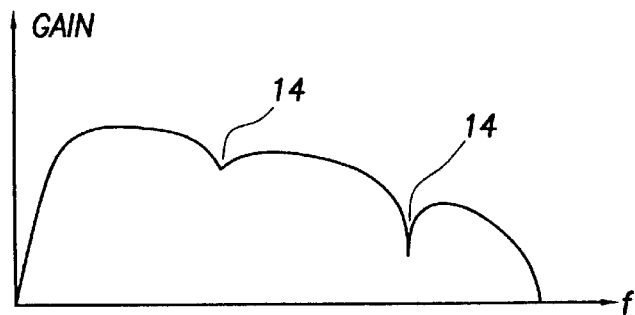
FIG. 3 shows an exemplary loop gain having two line impairments.
Figure 4:
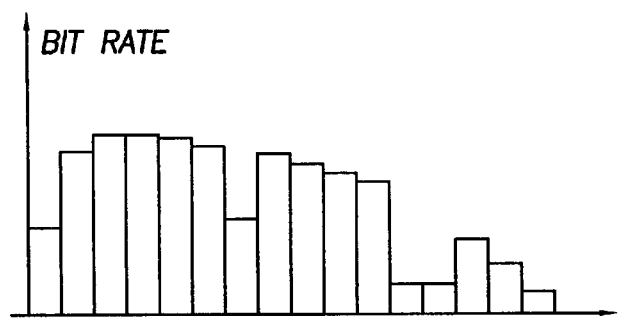
FIG. 4 shows an exemplary assignment of sub-channel bit rates based on signal-to-noise ratio of each channel.

Factors outside the frequency response of the twisted pair cable may affect the data transmission rate as well. For example, bridged taps may cause noise at particular places in the spectrum. FIG. 3 shows a plot of an exemplary loop gain having two line impairments 14. These line impairments could be caused, for example, by bridged taps on the twisted pair cable. To compensate for line impairments of a twisted pair cable, the preferred embodiment measures the data transmission capability of each sub-channel and assigns a data transmission rate for that sub-channel to insure that each channel is used at its maximum reliable data transmission rate given its signal to noise ratio. FIG. 4 shows an exemplary assignment of sub-channel bit rates based on the signal to noise ratio of each channel with reference to a twisted pair cable having the loop gain shown in FIG. 3. It will be understood the number of sub-channels in the exemplary figure has been reduced from the 256 possible channels to simplify the drawing. As shown, the bit rates for the sub-channels that correspond in frequency to the two line impairments 14 have been reduced. Depending on the amplitude of the noise source, a particular sub-channel's assigned bit rate may be reduced to zero.

Having described the concept that the overall bandwidth of the twisted pair cable is divided into discrete frequency sub-channels, or bins, the concept of a data frame can be explained. Each subsurface, or downhole, modem is assigned at least one of the many upstream communication sub-channels. It is upon these assigned frequency sub-channels that each downhole modem communicates with thesurface modem. However, each of the downhole modems communicates substantially simultaneously with the surface modem and therefore some mechanism must exist to align the data. This alignment mechanism is known as a super-frame.

For explanatory purposes, consider only a single subsurface modem communicating with the surface modem upon its assigned frequencies. Data collected by the geophdne associated with the subsurface modem is commumicated to the modem where the data is modulated, in the sense of the word that the data is manipulated such that it can be represented in the data transmission. This subsurface modem, having data that needs to be sent to the surface, begins to transmit data in its allocated sub-channels of the overall frequency bandwidth. FIG. 5 shows an exemplary bin transmission distribution of a particular subsurface modem within the upstream band at a given time instant. Although the bins are labeled as bin 1, bin 2, . . . , to bin N, it will be understood that these are bins within the upstream band and that they may not correspond to a bin labeling in the overall bandwidth of the twisted pair cable. Further, any number of bins may be assigned to a particular subsurface modem or node depending on the data transmission capabilities of the assigned bins. Sub-channels are assigned such that the sum of the data transmission capabilities meets or exceeds the data transmission rate required for that mode. If the assigned bins can support only relatively low data transmission rates, more bins are preferably assigned to give the subsurface modem a sufficient bandwidth to transmit the required amount of information. As indicated, the particular subsurface modem preferably transmits only in its allocated bins. This particular subsurface modem preferably does not transmit in any of the frequencies outside its allocated frequency bins so that only a small portion of thebandwidth is filled by this particular modem Stated otherwise, the particular subsurface modem transmits zeros in all bins outside its assigned bins. Now consider all the subsurface modems, with each subsurface modem transmitting in its allocated frequency sub-channels and each set of allocated sub-channels preferably is different than the allocated sub-channels of any other subsurface modem, such that substantially simultaneous communication occurs. Each subsurface modem transmitting in its allocated frequency sub-channels at the same time as every other subsurface modem then fills the allocated upstream communication bandwidth with data. This entire upstream traveling conglomeration of information is a super-frame. Each subsurface modem preferably transmits its respective data during a frame period, and the combination of all the subsurface modems transmitting in their allocated frequencies during a frame period creates the super-frame for that frame period. This super-frame can be read during a frame period by the surface modem, then the surface modem extracts the data coded within each sub-channel from each downhole modem.

Much like traditional point to point ADSL, the preferred embodiment of this invention uses a substantial number of error correction and error detection techniques to insure a maximum overall data transfer rate. Because many of the same error correction and error detection schemes are duplicated in the preferred embodiment of this invention as compared to a traditional ADSL system super-frame, the super-frame created may appear similar. However, to use all the data error detection/correction mechanisms requires substantial changes to the traditional point to point ADSL system components.

In traditional point to point ADSL, the entire super-frame is scrambled before the data signal is applied to the modulator of the system. Scrambling is done generally by a logical XORing of the data with a pseudo-random binary sequence. By scrambling the data, the chances are decreased that long strings of zeros or long strings of ones are applied to the modulator. Applying long strings of zeros or ones could cause timing and alignment problems. Scrambling is done in the preferred embodiment of this invention, but given that there are multiple subsurface modems, individual portions of the overall scrambling must be done individually by the modems. Each subsurface modem of the preferred embodiment scrambles data before modulation within its allocated frequency sub-channels, or sub-frame, such that the benefits of scrambling are achieved in the preferred embodiment. FIG. 6 shows data scrambling by one subsurface modem, or node, within its allocated sub-channels.

Forward error correction (FEC) symbols are added to aid in correcting transmission errors that occur over the communication pathway. There are at least two types of forward error correction schemes that may be used in the preferred embodiment. The first, and the preferred scheme, is Reed-Solomon coding. The second is Trellis-Coded Modulation (TCM). In Reed-Solomon coding, one or more symbols are appended to each frame of the data. Using the appended symbols, data errors in the transmission can be corrected after demodulation. In TCM, the redundancy is integrated into the data over several sub-frames by means of convolution codes. Upon demodulation, data errors may be corrected by use of the redundancy created by the convolution coding. Independent of which FEC method is used, in the preferred embodiment the forward error correction scheme is implemented on a sub-frame basis. Thus, rather than applying FEC information to the overall super-frame, which is done in traditional point-to-point ADSL, each individual subsurface modem calculates its forward error correction information and transmits that forward error correction information along with its respective data only within its allocated sub-frame. FIG. 7 shows an exemplary sub-frame having scrambled data within allocated bins and a FEC symbol 18 appended thereto. Forward error correction is then preferably accomplished by each subsurface modem, or node, applying FEC within its allocated bins, and not transmitting outside its allocated bins so as not to cause interference with sub-frame transmissions by other subsurface modems.

Any communication pathway, including a twisted pair cable, has a transfer function associated with the propagation of information across or through it. For example, a waveform applied at one end of a twisted pair cable propagates down the cable and may be detected at a second end. However, in propagating down the twisted pair cable, the applied wave form is typically attenuated, loses signal amplitude, and has its frequency components disturbed slightly. To compensate for this attenuation and frequency dispersion, communication systems typically perform equalization on the waveform that exits the communication pathway. In the frequency domain, the transfer function of a communication pathway, H(f), is multiplied by a compensation function in an attempt to bring the overall effect of communication pathway on the transmitted signal to a minimum. The time domain equivalent operation to multiplication in the frequency domain is a convolution. Because convolution calculations in a digital environment may involve less computation overhead than multiplication of a transfer function in the frequency domain, in the preferred embodiment equalization is done in the time domain by a digital signal processor.

However, this equalization may also be performed on a frame-by-frame basis in the frequency domain. To allow for this, cyclic prefixes and cyclic suffixes preferably are used to reduce inter-symbol interference occurring between superframes when compensating for the communication pathway transfer function. As one of ordinary skill in the art will understand, performing frequency domain equalization in a digital processor, or other digital environment, is equivalent to circular convolution, and hence creates equalization errors if the signal being equalized is not cyclic in nature. The cyclic prefix and cyclic suffix are added to simulate that the data super-frame is cyclic. Unlike traditional ADSL where attaching of a cyclic prefix and cyclic suffix is relatively easy, the preferred embodiment of this invention has multiple downhole or subsurface modems transmitting upstream, with each modem transmitting only in its allocated frequency sub-channels. Attaching these cyclic prefixes and cyclic suffixes becomes more complicated.

To attach a cyclic prefix and cyclic suffix in the situation where there are multiple upstream transmitting modems, preferably one modem is assigned to transmit a cyclic prefix and cyclic suffix, in addition to transmitting its data within its allocated frequency sub-frame. It will be understood that the remaining subsurface modems preferably do not attempt to transmit during transmission of the cyclic prefix and cyclic suffix. Using this method, the one modem transmitting cyclic prefixes and cyclic suffixes preferably adjusts the attached codes in each frequency band to compensate for the transfer function characteristics associated with that band given that, depending on the depth of the assigned modem, the attached prefixes and suffixes may travel farther or not as far as the actual data to which they are adjacent at the upstream modem. In a second embodiment, each subsurface modem transmits cyclic codes with its data, but only within its assigned frequency sub-channels. Thus, in this second embodiment, cyclic codes are attached throughout, but this is done on a per sub-channel basis.

Forward error correction schemes as discussed above have the ability to correct some data transmission errors. However, these schemes are unable to correct long strings of errors associated with 'bursty' type data transmission errors. In other words, these forward error correction schemes can correct bit errors in the data transmission when data errors are few in number and localized. When long strings of information are corrupted, the forward error correction schemes are deficient. To combat the problem of bursty type data transmission errors, a technique known as interleaving preferably is used. Interleaving mixes data to be sent such that related information is not placed together within the block of information to be transmitted. If bursty type data transmission errors occur, once the data is de-interleaved, the bursty type error is converted into localized errors such that the forward error correction mechanism can function. There are two main types of interleaving. The first interleaving technique is block interleaving. In block interleaving, the data bit stream to be transmitted is read into a matrix of rows and columns. The data stream fills each row before incrementing to the next row. The data is read out of the matrix by columns whereby each column is emptied before incrementing to the next column. In this way, the data is interleaved so that bursty errors are distributed throughout the data sent when the information is de-interleaved. The second type of interleaving is convolution interleaving. Convolution interleaving is similar to block interleaving in that data is read into a matrix of rows and columns and then read out in columns and rows. The difference is that in convolution interleaving, the data being placed in the matrix does not start at the same column each time, but rather, shifts by some known quantity. Though these interleaving techniques may be somewhat different, the overall goal of distributing bursty type errors when the block of data sent is de-interleaved is accomplished. Convolution interleaving is the preferred interleaving method. In the preferred embodiment of this invention, having multiple upstream transmitting modems, the interleaving technique is practiced by each subsurface modem to accommodate interleaving across all the data sent.

Figure 8:
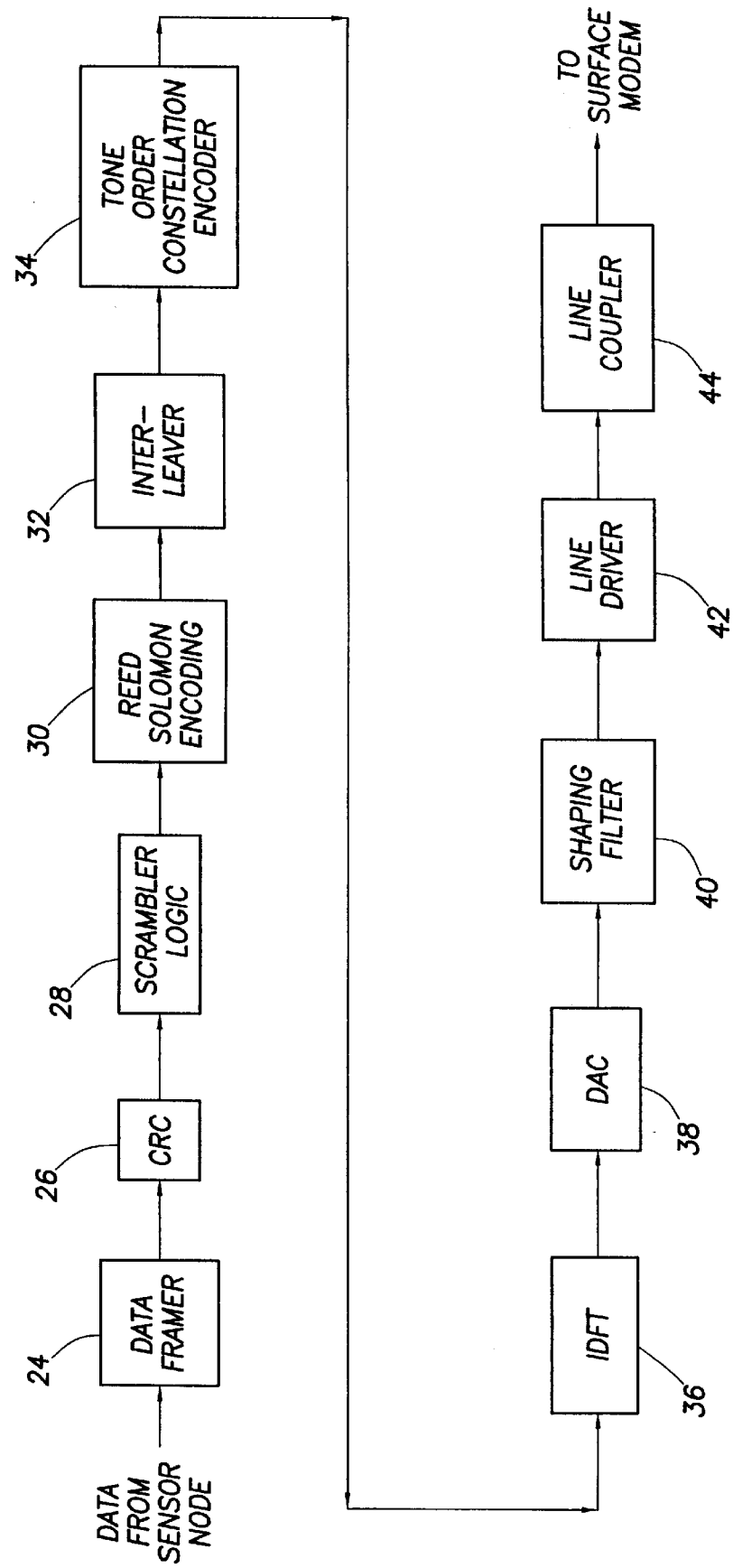
FIG. 8 shows a block diagram of components for transmission of data from subsurface modems to the surface modems.

FIG. 8 shows a block diagram of the components required for a transmission of data from subsurface modems to the surface modem. Preferably, each subsurface modem has all these blocks, either as discrete hardware, or preferably implemented as in software of a digital system within the modem. The data framer 24 organizes the information sent from the sensor, or geophone, for transmission. Next, cyclic redundancy codes (CRC) are appended to the data at block 26 such that, at the surface modem, transmission error detection can be accomplished. The data is preferably then sent to scrambler logic 28, where the data is scrambled to lessen the chance that long strings of zeros or ones are passed to the modulator as discussed above. Once scrambled, the subsurface modem appends error correction symbols to the data, preferably using a Reed-Solomon encoder, in block 30. After having forward error correction symbols attached, the subsurface modem interleaves the data at block 32, to reduce the possibility of bursty type transmission errors corrupting the overall data. After interleaving the data, the subsurface modem applies tone order and constellation encoder techniques to the data at block 34. The subsurface modem, within its allocated frequency bins, encodes the data to be transmitted preferably using Quadrature Amplitude Modulation (QAM).

Figure 9:
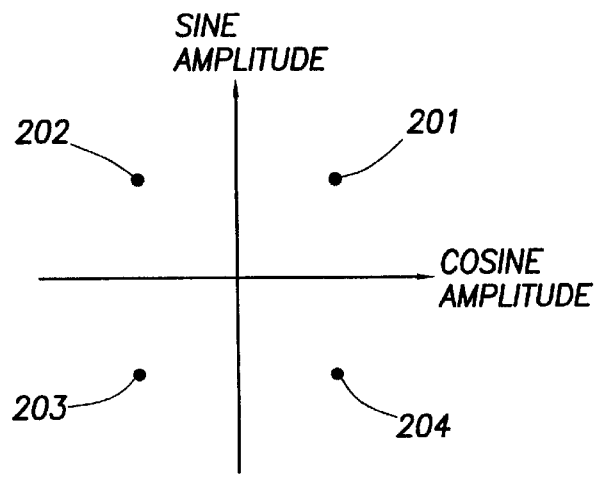
FIG. 9 shows a four point quadrature amplitude modulation scheme graph for data encoding.

Quadrature Amplitude Modulation is a modulation technique involving the use of orthogonal cyclic waves to represent information. Information is encoded in a QAM system by mixing together a sine wave and a cosine wave having the same frequency within a particular frequency bin. Information is encoded in the amplitude of each of the respective sine and cosine waves. As an example, and referring to FIG. 9, consider a four point QAM system which can represent two bits of information. If both the sine and cosine component have positive amplitudes, this maps to the first quadrant 201 representing a first possible value of the four possible values of the two bit word. Likewise, if both the sine and cosine wave have negative amplitudes, this maps to the third quadrant 204 and represents a second value of the four possible values. Four point QAM represents the lowest order of QAM and may be used on a sub-channel or frequency bin with a very low signal-to-noise ratio. As the signal-to-noise ratio in each bin increases, multiple orders of QAM may be used. Given proper conditions, as many as 15 bits of information may be encoded within a single sub-channel.

Referring again to FIG. 8, each subsurface modem, having been allocated particular frequency bins with each bin having a measured signal-to-noise ratio, modulates its data in the tone ordering and constellation encoder block 34 into particular frequency bins. The tone order and constellation encoder 34 then preferably designates at least one set of sine and cosine waves whose combined amplitude represents the information to be transmitted. One of ordinary skill in the art will realize that the tone ordering and constellation encoder does not actually created sine and cosine waves having the amplitudes necessary to represent the informnation, but rather, assigns, in the frequency domain, an amplitude and frequency required for each wave to represent the information. This information then transfers to an Inverse Discrete Fourier Transform (IDFT) block 36 which takes the information from the tone order and constellation encoder 34 (which is in the frequency domain) and performs an inverse discrete Fourier transform. The IDFT block 36 creates a digital representation of the time varying signal, as it would exist in the time domain, which represents a summation of the sine and cosine waves with their respective amplitudes representing information in the allocated bins of the subsurface modem. If required of the particular subsurface modem, the subsurface modem adds a cyclic prefix and cyclic suffix, as described above, in anticipation of frequency domain equalization. Then, the digital representation of the time domain waveform is applied to a digital to analog converter (DAC) 38 which converts the digital representation of the time domain signal created by the IDFT block 36 to an actual time varying signal. This time varying signal is applied to shaping filter 40, which limits out-of-band frequency components. Next, the signal is applied to a line driver 42. The line driver 42 supplies the necessary power to transmit the information to the surface modem.

Finally, each subsurface modem contains a line coupler 44 which couples the time varying signal onto the twisted pair cable to be transmitted to the upstream modem. The twisted pair cable preferably carries a floating voltage that is differentially driven by each subsurface modem to place their respective time varying waveforms on the line. In one embodiment, as many as two hundred subsurface modems may be attached to a single twisted pair cable. In such a situation, it is important that when coupling the signal from each subsurface modem to the twisted pair cable that the coupling technique of each subsurface modem does not load the transmission line such that signals from other subsurface modems are attenuated. Line coupling in the preferred embodiment is described in greater detail below.

Figure 10:
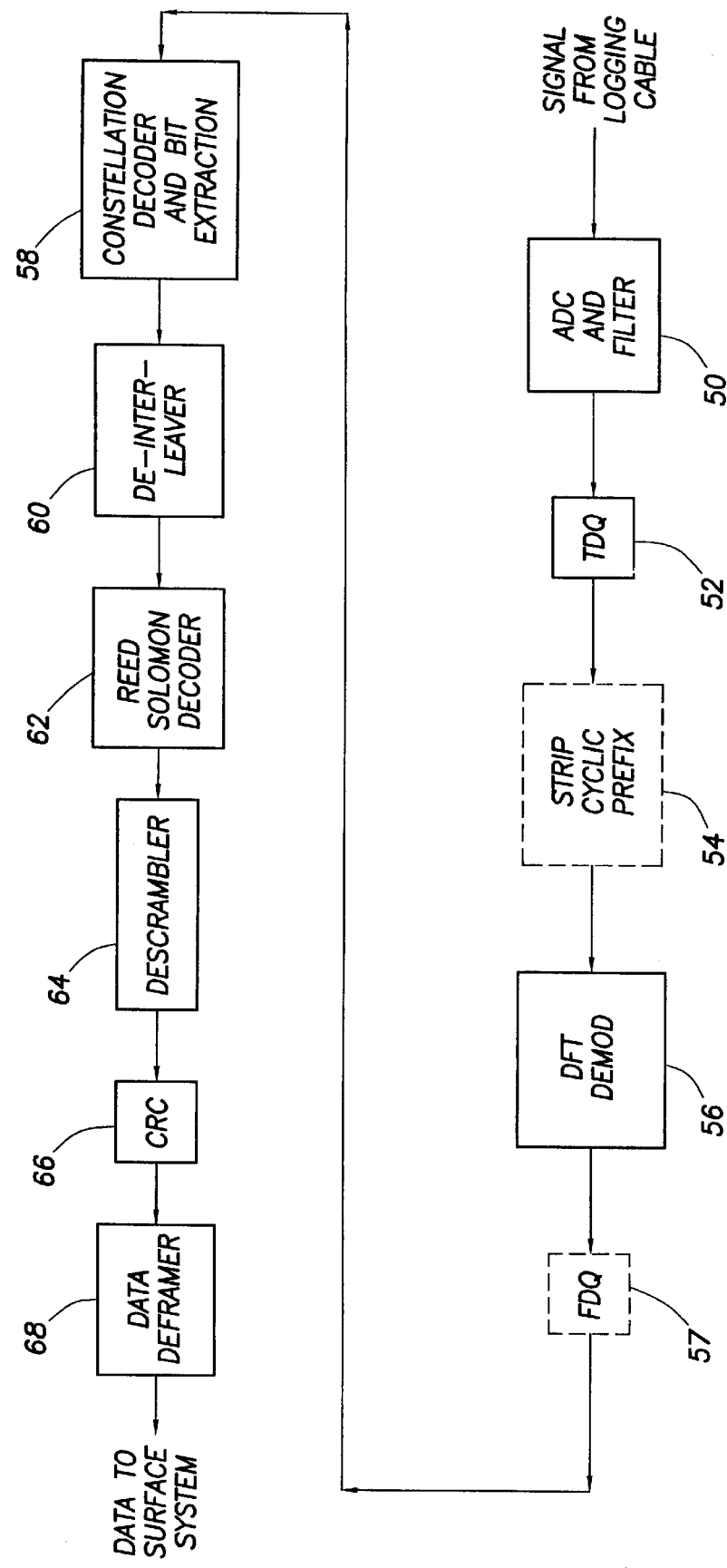
FIG. 10 shows a block diagram of components required to extract data from multiple subsurface modems.

The surface modem must be capable of extracting the data from the multiple subsurface modems. FIG. 10 shows a block diagram of the components required in the surface modem to extract data from multiple subsurface modems. First, the surface modem couples to a twisted pair cable. If more than one twisted pair cable is used, a modem is provided for each. The time domain signal existing on the twisted pair cable is read from the cable and applied to an analog to digital converter 50, which creates a digital representation of the time domain signal. Next, time domain equalization may be performed in block in block 52 to compensate for the transfer function of the transmission pathway, as described above. However, one of ordinary skill in the art will realize that frequency domain equalization could be used in place of the time domain equalization. After time domain equalization takes place, the cyclic prefix and cyclic suffix used to make the super-frame look periodic in nature are stripped from the super-frame at block 54. The modified digital representation of the time domain signal is then applied to a Discrete Fourier Transform (DFT) block 56 which converts the digital representation of the time domain waveform into its frequency domain counterpart. Once in the frequency domain, the super-frame information is de-modulated from its quadrature amplitude modulation, in the constellation decoder and bit extractor block 58, to reveal the data within. The surface modem preferably has previously determined the data transmission capability of each sub-channel. Each subsurface modem assigned to transmit within a bin must transmit at the assigned data transmission rate. Given the channel transmission rate, and therefore the order of QAM applied to each bin, demodulating in the constellation decoder involves extracting the information based on these previously known charmel parameters.

Once demodulated, the subsurface modem must de-interleave the data to compensate for interleaving on the transmission end in block 60. However, interleaving in the preferred embodiment is done within each subsurface modem. Therefore, the surface modem must group the data extracted from each subsurface modem and then de-interleave the data in blocks with each block associated with each subsurface modem. The data within each sub-frame is then sent to a Reed-Soloman decoder block 62 where, using the forward error correction symbols added by each subsurface modem, some error correction can take place on a sub-frame basis. It will be understood that since each subsurface modem applied forward error correction within its sub-frame only, the surface modem must be capable of decoding the forward error correction symbols within each sub-frame of information. The surface modem then de-scrambles the data in block 64 to compensate for the scrambling done by each subsurface modem. In block 66 the subsurface modem uses the cyclic redundancy check codes to determine the number of transmission errors associated with each sub-frame of information. Data is then de-framed in block 68 and passed to a surface system.

FIGS. 8 and 10 respectively show the blocks necessary to send, from a subsurface modem, and receive, by a surface modem, data gathered by geophones associated with sub-surface modems. However, the surface modem must be capable of communicating with subsurface modems to assign bins for transmission and set transmission rates within assigned bins. Likewise, each subsurface modem must be able to receive bin assignments and transmission rates within those bins from the surface modem. Therefore, each subsurface modem will have blocks substantially similar to those of FIG. 10 to aid in receiving communication from the surface modem. Likewise, the surface mode will have blocks substantially similar to those of FIG. 10 to aid in transmitting bin assignments and data transmission rates to the subsurface modems. Transmission of information from the surface modem to subsurface modems must involve an addressing scheme such that the subsurface modems can discriminate information targeting a particular subsurface modem, and ignoring the rest.

Figure 11:
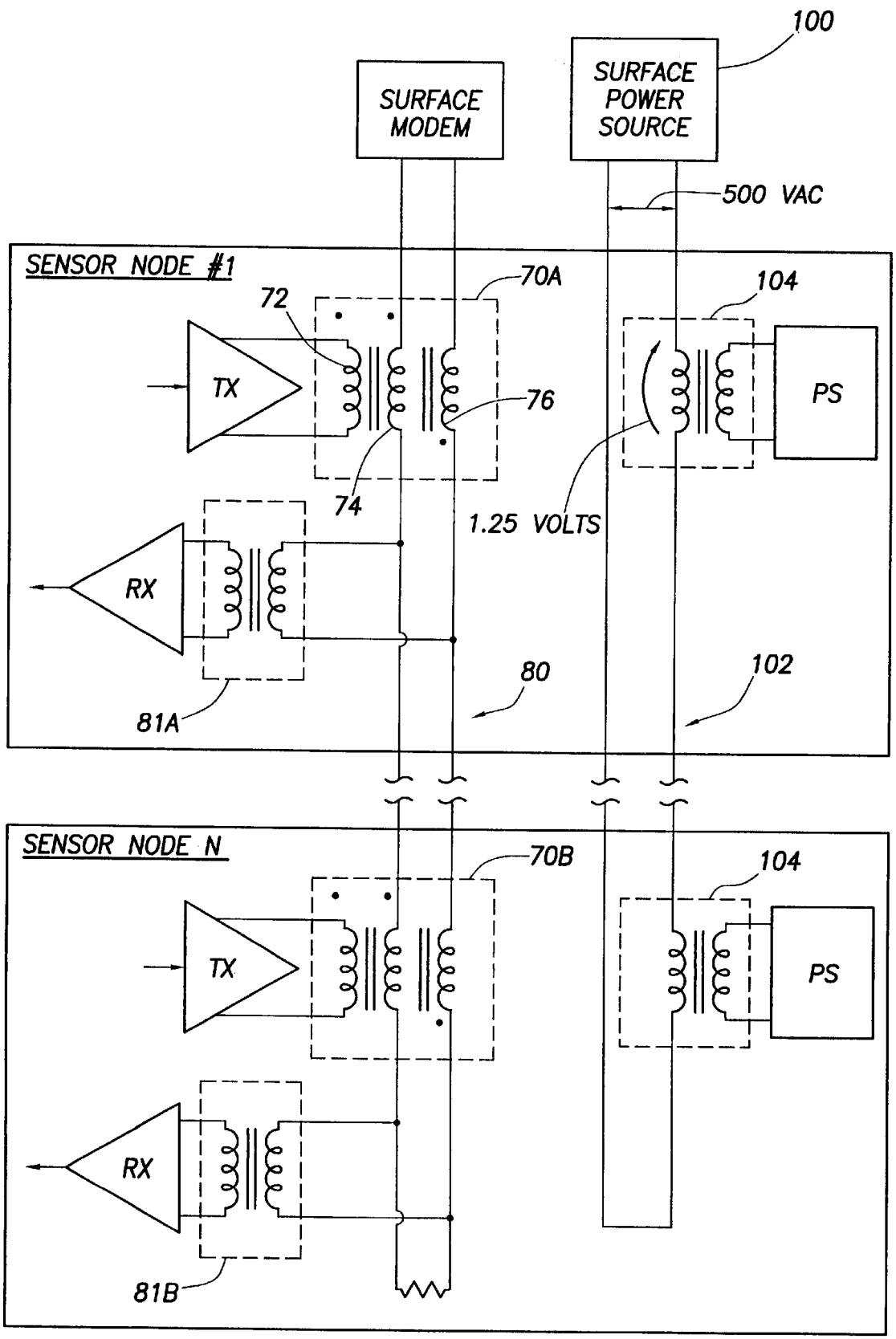
FIG. 11 shows a partial electrical schematic showing line coupling for use with the described embodiments.

As mentioned above, each subsurface modem must couple to the twisted pair cable so that information can be placed on and read from the twisted pair cable as necessary. As described herein, multiple subsurface modems preferably couple to the twisted pair cable. Indeed, in one embodiment as many as 200 modems couple to the twisted pair cable which may cause loading problems on the twisted pair cable and affect data communications. To alleviate this potential loading problem, the preferred embodiment includes an isolation transformer 70 for each subsurface modem which isolates each subsurface modem from the twisted pair cable, as shown in FIG. 11. This isolation transformer 70 preferably has a single primary winding 72, which is coupled to the subsurface modem, and two secondary windings 74 and 76, with each secondary circuit coupled in one line of the twisted pair cable. Each secondary of the transformer has a voltage induced upon it 180 degrees out of phase from the other secondary. Given that each secondary is coupled to one of the cables in the twisted pair cable, this coupling transfornmer therefore differentially drives the signal onto the twisted pair cable 80. It will be understood that each subsurface modem has its own line coupling transformer so that as many as two hundred line coupling transformers may be attached to a single twisted pair cable.

Also shown in FIG. 11 is a second isolation transformer 80 associated with each subsurface modem's receiving circuit. This isolation transformer is a one-to-one transformer that couples signals off the twisted pair cable 80. The purpose of such a transformer preferably is to electrically isolate each subsurface modem from the twisted pair cable 80 to avoid the problems associated with ground loops. If the particular system is not susceptible to ground loops, transformer 81 may not be needed.

Referring still to FIG. 11, there is shown a surface power source 100 coupled to a power line 102. Power line 102 extends down into the borehole to provide power to each subsurface modem and is preferably two 18 gauge wires. Power source 100 preferably places sufficient alternating current voltages to supply each subsurface modem over line loss. Each subsurface modem has associated with it a power transformer 104 that taps a small portion of the overall power on the power line 102 for use in the particular subsurface modem.

Figure 12:
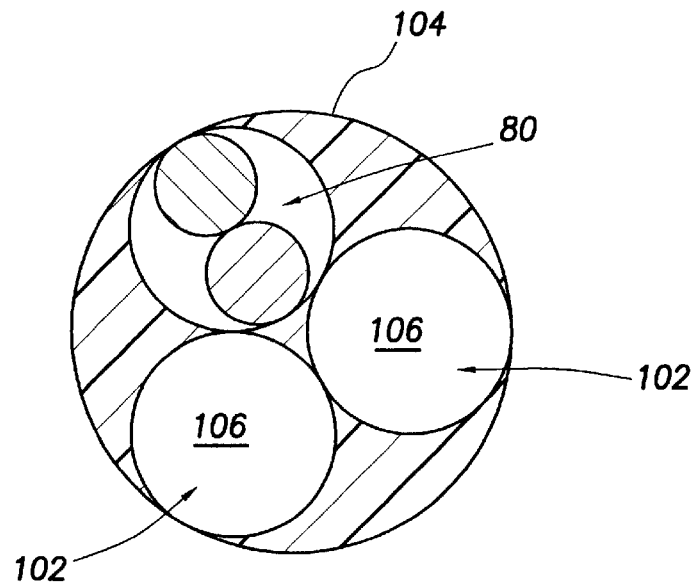
FIG. 12 shows a cross-sectional view of a cable bundle having a single twisted pair cable.
Figure 13:
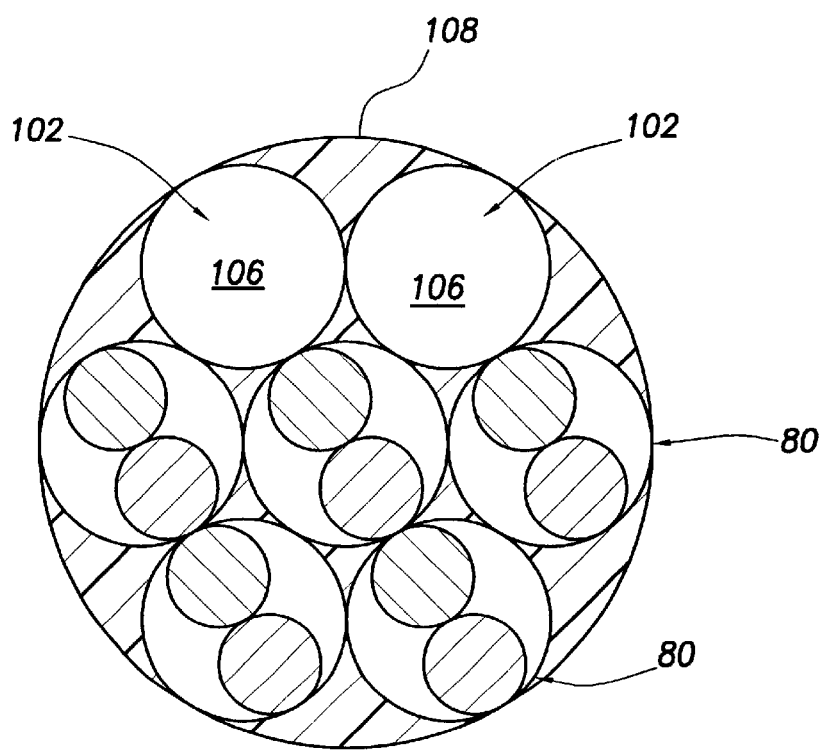
FIG. 13 shows a cross-sectional view of a cable bundle having 5 twisted pair cables.

FIGS. 12 and 13 show a cross-sectional view of two embodiments of the cable bundles envisioned for use in the preferred embodiment. FIG. 12 shows a first cable bundle 104 having a single twisted pair cable 80 within the overall cable bundle. Also within the cable is power line 102 consisting of two 18 gauge wires, 106. Cable bundle 104 is preferably used in the implementation where all the subsurface modems attach to the single twisted pair cable 80 and each subsurface modem compresses its data before transmission such that data rates for 4D seismic can be achieved. As mentioned above, power is coupled to each subsurface modem by placing AC currents upon the power line 102.

Also envisioned is a cable bundle 108 having five twisted pair cables 80 and the power line 102. Cable bundle 108 is preferably used in the implementation where approximately 40 subsurface modems are coupled to each of the five twisted pair cables. In this embodiment, data compression preferably is not used, but given that there are five twisted pair cables 80, the data transmission rate needed for 4D seismic can be achieved.

Although the cable bundles 104 and 108 are shown to have one and five twisted pair cables respectively, this should not be construed as a limitation on the scope of the invention. Indeed, any number of twisted pair cables could be incorporated into the cable bundles and still be within the spirit of this invention so long as multiple modems attach to each twisted pair. Likewise, the specifics of the cable bundle construction are not disclosed. One of ordinary skill in the art, now knowing the application and the number of cables required, could construct the cable bundles capable of practicing this disclosure.

Figure 14:
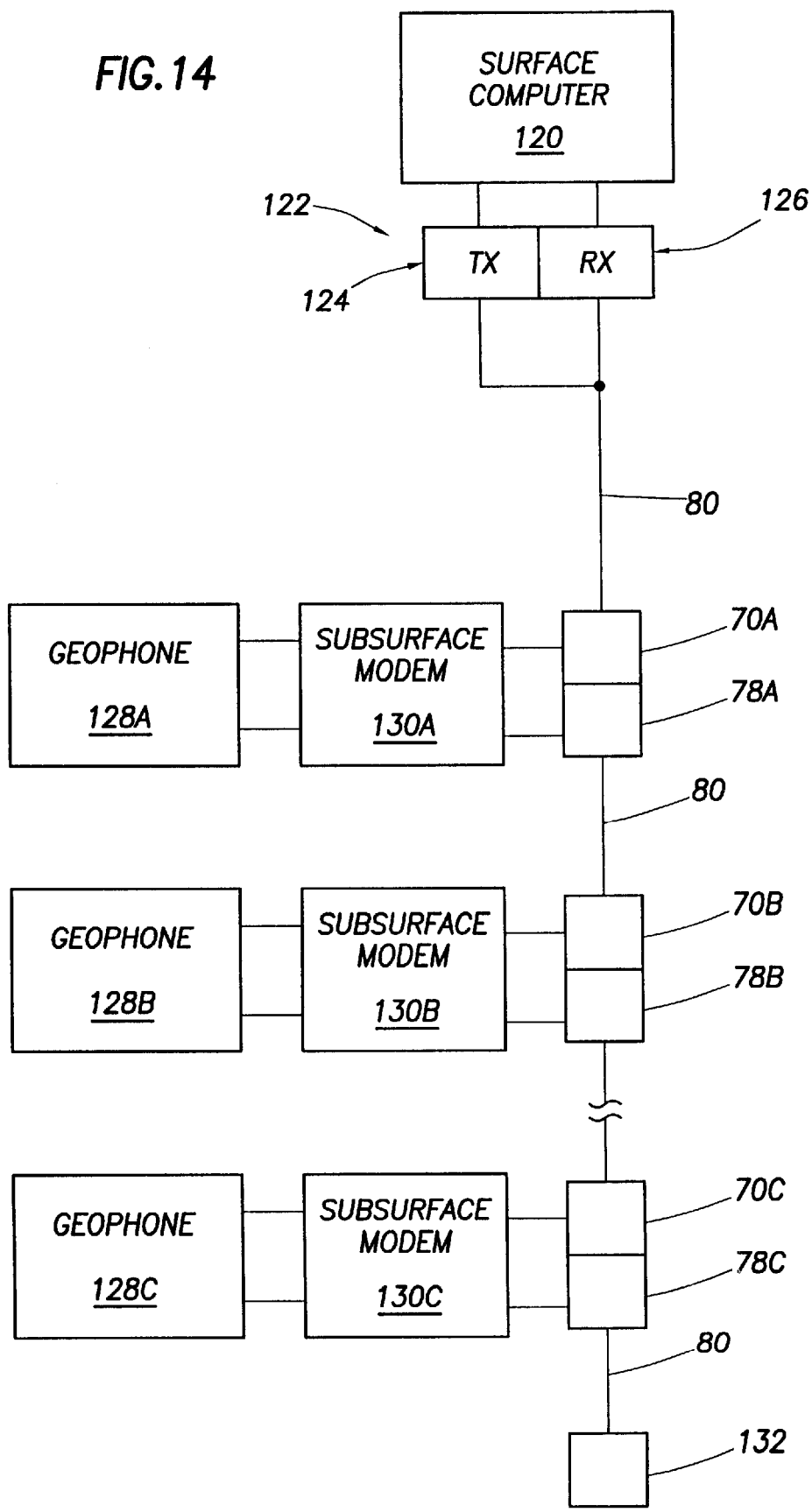
FIG. 14 shows an exemplary embodiment of an implementation using a single twisted pair cable as the communications medium.

FIG. 14 shows an exemplary embodiment of an implementation using a single twisted pair cable and data compression. The figure describes surface computer 120 coupled to surface modem 122. Surface modem 122 comprises a transmit portion 124 and receive portion 126. Although the transmit andreceive portions are shown as separate elements, one of ordinary skill in the art will realize this functionality can be contained within the electronics and software of a single modem unit. Surface modem 122 preferably couples to the twisted pair cable 80 which extends into a borehole (not specifically shown), and, in this embodiment, to each subsurface modem 130. As the twisted pair cable 80 traverses each subsurface modem 130, each subsurface modem's signal line coupling transformer 70 and receive isolation transformer 78 couple to the twisted pair cable 80. For simplicity of the drawing, only three subsurface modems 130 are shown associated with their respective geophones 128. However, it will be understood that 200 geophones and subsurface modes, or more, may attach to the twisted pair cable 80 in a single installation. The twisted pair cables and geophones may reach a depth of 10,000 feet or more into the Earth, depending on the particular application. The twisted pair cables is terminated at its bottom and within the borehole by a cable terminator 132.

Although this embodiment is described as implemented with data compression, such compression is only required where the data rates needed exceed the twisted pair maximum data rate of approximately 6 to 8 megabits per second. If a particular application requires less data throughput, or fewer sensor nodes, a single twisted pair cable embodiment without data compression is possible and still within the spirit of this invention.

Figure 15:
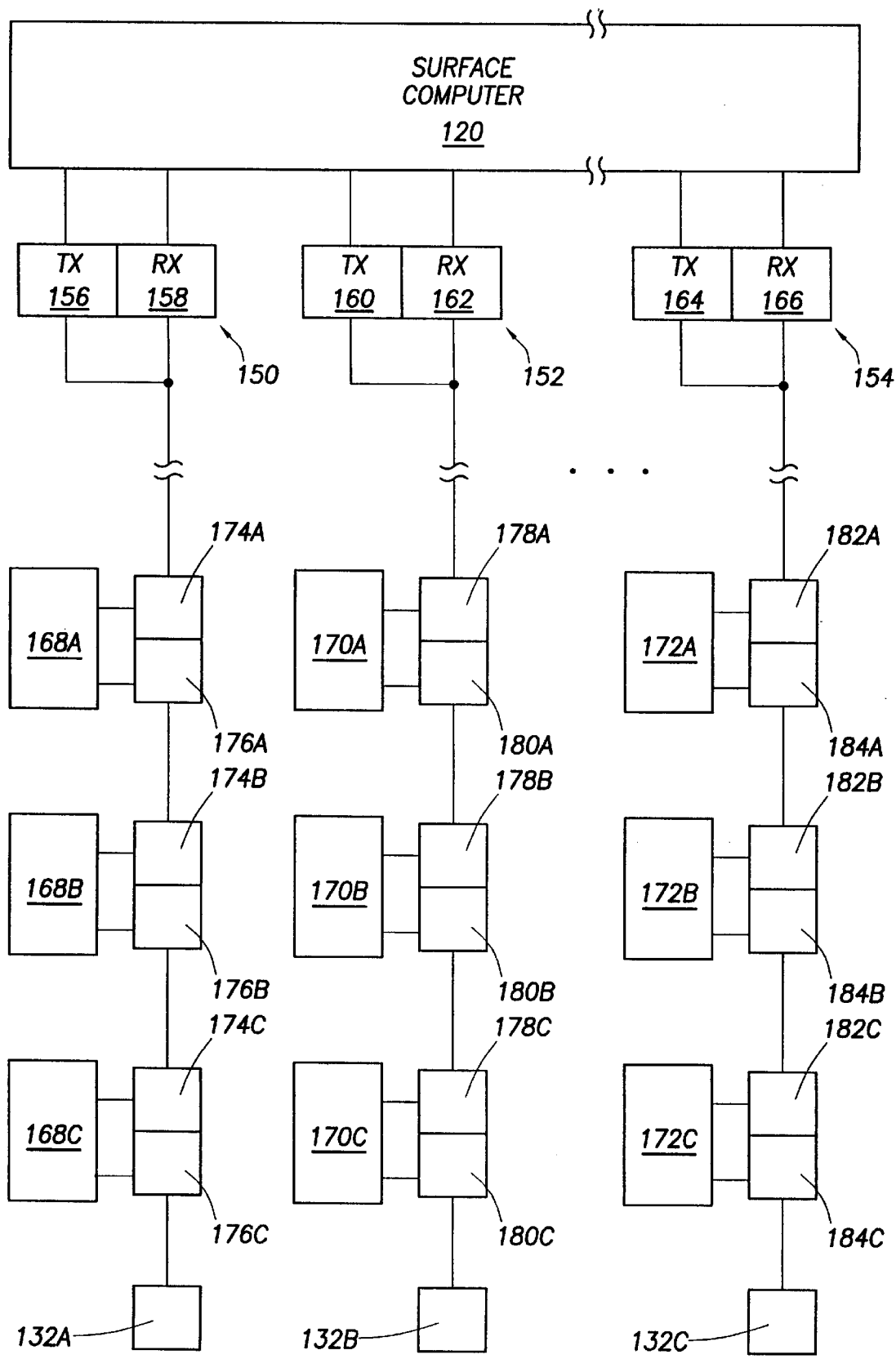
FIG. 15 shows an exemplary embodiment for use with a cable bundle having multiple twisted pair cables.

FIG. 15 shows an embodiment for use with a multiple twisted pair cable bundle. In this embodiment, the surface computer 120 communicates with a plurality of the subsurface modems, 168, 170, 172. Each set of subsurface modems on a twisted pair cable can be referred to as a grouping. Thus, subsurface modems 168A, B and C comprise one grouping. It will be understood that this embodiment envisions as many as forty subsurface modems attached within each grouping. More subsurface modems or fewer subsurface modems could be used depending on the application. Each grouping of subsurface modems communicates to the surface computer 120 via a surface modem 150, 152, 154. Thus, surface modem 150 preferably communicates with all the subsurface modems 168 in its respective grouping. Likewise, surface modems 152 and 154 communicate with subsurface modems 170 and 172 respectively. As indicated in the figure, each subsurface modem preferably couples to its respective twisted pair cable through transmit line couplers 174, 178, 182, and further couples to the twisted pair by way of receive line couplers 176, 180, 184.

Given that each twisted pair cable can carry as many as 6 to 8 megabits per second of information, use of the embodiment described in FIG. 15 preferably does not require data compression at the subsurface modem end to facilitate the throughput necessary for 4D seismic imaging. Although FIG. 15 only expressly shows three groupings, the preferred embodiment of a multiple twisted pair implementation preferably has five groupings of subsurface modems corresponding to the five twisted pairs in the cable bundle as shown in FIG. 13. Each twisted pair cable of a grouping preferably couples to approximately forty subsurface modem such that given all the nodes, approximately two hundred subsurface modems couple to the overall cable. Each subsurface modem 168, 170, 172 preferably is associated with a geophone such that approximately two hundred geophones exist in the system, a sufficient number to perform 4D seismic imaging.

The exemplary cable bundle shown in FIG. 13 could be used in the multiple node embodiment shown in FIG. 15. Although the description of the embodiment discussed with respect to FIG. 15 is disclosed to not involve data compression by the subsurface modems, if a higher data rate were required, some or all of the nodes of this embodiment could compress data as disclosed in reference to the singe node embodiment of FIG. 14.

Synchronization of signals sent by the plurality of subsurface modems will now be discussed with reference to a single grouping of the multiple groupings shown in FIG. 15, or the embodiment shown in FIG. 14. Use of geophones in 4D seismic imaging involves placing each geophone at some depth within the well bore. Traveling down into the well bore from the surface, the first geophone may be as many as several hundred or thousands of feet from the surface. Each respective geophone is preferably then located some known distance below the one immediately above or below it. The lower most geophone may be as deep as 10,000 to 12,000 feet below the surface, or more. Although electrical signals travelling over twisted pair cables move at very high speeds, the difference in distance between each subsurface modem can cause data alignment problems. That is, the propagation time of the data from the most shallow modem to the surface will be shorter than the propagation time from the deepest modem to the surface. This delay in propagation time could cause misalignment of data sent in a super-frame, especially if the difference in propagation time approaches a frame period.

Thus, some mechanism must exist to align, in time, the information sent from each subsurface modem back to the surface modem. Data alignment in the preferred embodiment is accomplished by the use of the continuous timing tone in combination with calculation of a phase delay for each subsurface modem. Preferably, one channel in the bandwidth of the twisted pair cable is dedicated to carrying a continuous timing tone broadcast from the surface modem. Each subsurface modem preferably continuously detects this timing tone and phase locks to the timing frequency using a phase locked loop. Based on the frequency of the timing tone, each subsurface modem generates a clock signal used to synchronize transmission of information gathered by its respective geophone. In other words, based on the frequency of the timing tone, each subsurface modem calculates frame periods and transmits data during each frame period. However, because each subsurface modem preferably resides at a different depth than any other subsurface modem, having all subsurface modems transmit at exactly the same point in time will not align the data at the surface given the differences in propagation times based on the depth of each subsurface modem. Thus, subsurface modems closer to the surface must time delay an initial transmission (the delay is a function of depth) such that each transmission by each subsurface modem during a frame period will arrive at substantially the same time.

Figure 16:
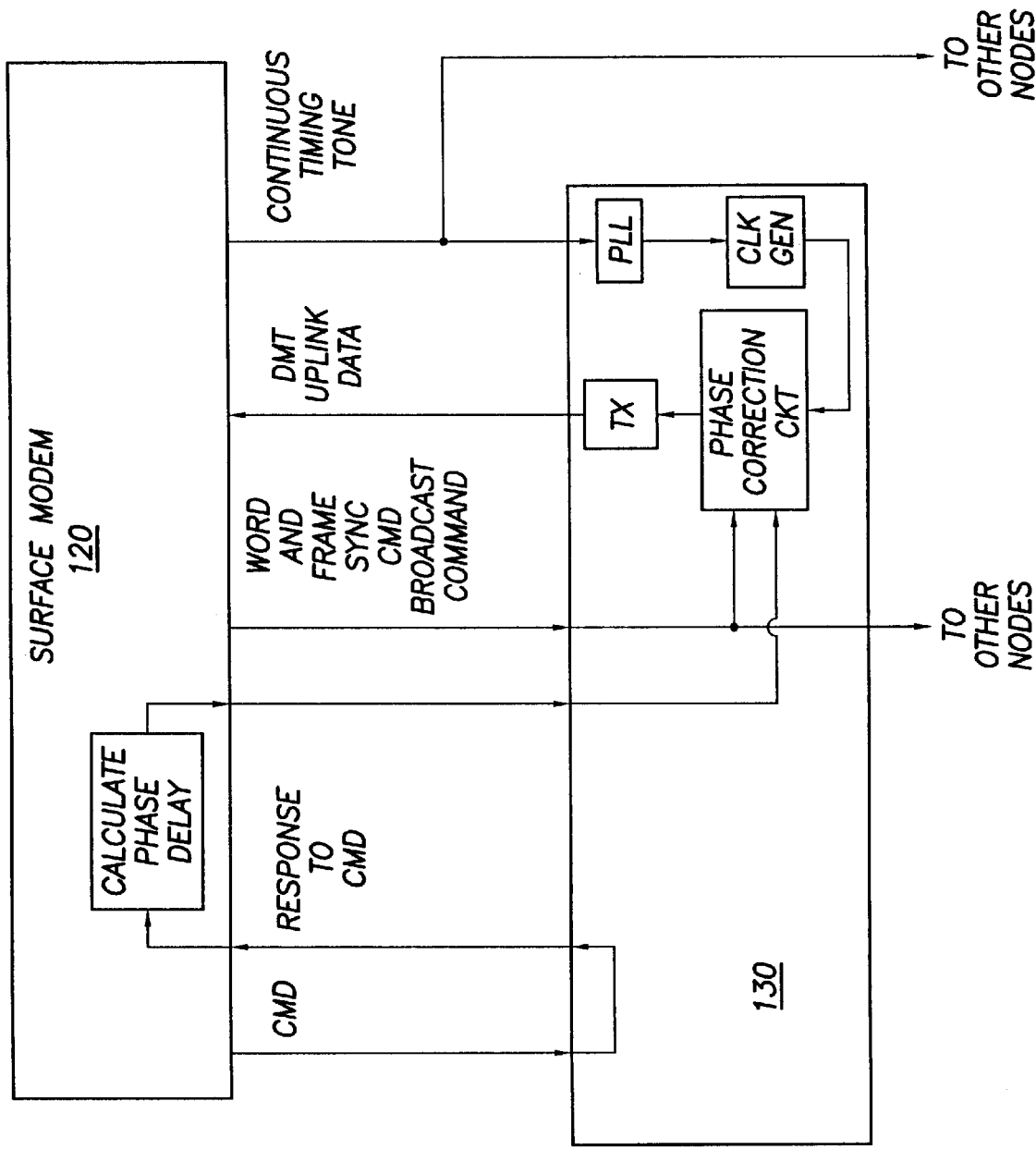
FIG. 16 shows the signals exchanged between each subsurface modem required for calculation of a phase delay.

FIG. 16 shows the signals exchanged between a surface modem 120 and each subsurface modem 130. Surface modem 120 first sends a command addressed to a particular subsurface modem 130. Although all subsurface modems are coupled to the twisted pair cable over which the command is sent, only the subsurface modem specifically addressed takes any action based on the command. The command could take any form so long as it involves the subsurface modem sending some response to the command back to the subsurface modem. Based on the round trip time of the command signal, the surface modem 120 calculates a phase delay parameter for the specific subsurface modem addressed. The calculation of the phase delay could be as simply as dividing the overall propagation time of the command to the subsurface modem and back in half, or as complicated as calculating the particular phase delay parameter based on the longest response time of all the subsurface modems. That is, the more complicated determination involves polling each subsurface modem coupled to a twisted pair cable, and calculating the phase delay as the difference between the longest response, associated with the subsurface modem farthest from the surface modem, and the response time for the particular subsurface modem. In either case, the subsurface modem farthest away from the surface modem preferably does not phase delay an initial transmission at all. The subsurface modem closest to the surface modem preferably delays its initial transmission by an amount of time, calculated preferably by the surface modem, representing the amount of time it takes the transmission from the deepest subsurface modem to reach, physically, the depth of the closest subsurface modem. Each subsurface modem between them preferably phase delays according to depth, such that each transmission arrives at the surface modem during its respective frame period, regardless of the depth from which it was transmitted.

After calculating a phase delay parameter, the surface modem 120 transmits the phase delay parameter to the particular subsurface modem 130. The particular subsurface modem uses the calculated parameter to time delay an initial transmission. After the first delay, data frames are sent continuously thereafter. Stated otherwise, transmission by all of the subsurface modems within a frame period is always done with the same frequency. The delay parameter calculated for each subsurface modem represents a phase delay for transmission within the frequency. The calculated phase delay remains unchanged until the system re-initializes. Thus, saying a particular subsurface modem time delays an initial transmission and then broadcasts continuously in each subsequent frame period is the equivalent of saying each subsurface modem transmits at the same frequency but each transmits with an assigned phase delay.

Although FIG. 16 used a reference number 130 to indicate the subsurface modem of the figure, use of this number, which is the same as that used in FIG. 14, should not be construed as limiting the principles described to just the single twisted pair cable embodiment. Indeed, given that each subsurface modem needs to have a phase correction parameter calculated for it based on its distance from the surface modem, the discussion is equally valid and required for proper alignment of data for each subsurface modem 168, 170, 172 of the embodiment described with reference to FIG. 15.

Figure 17:
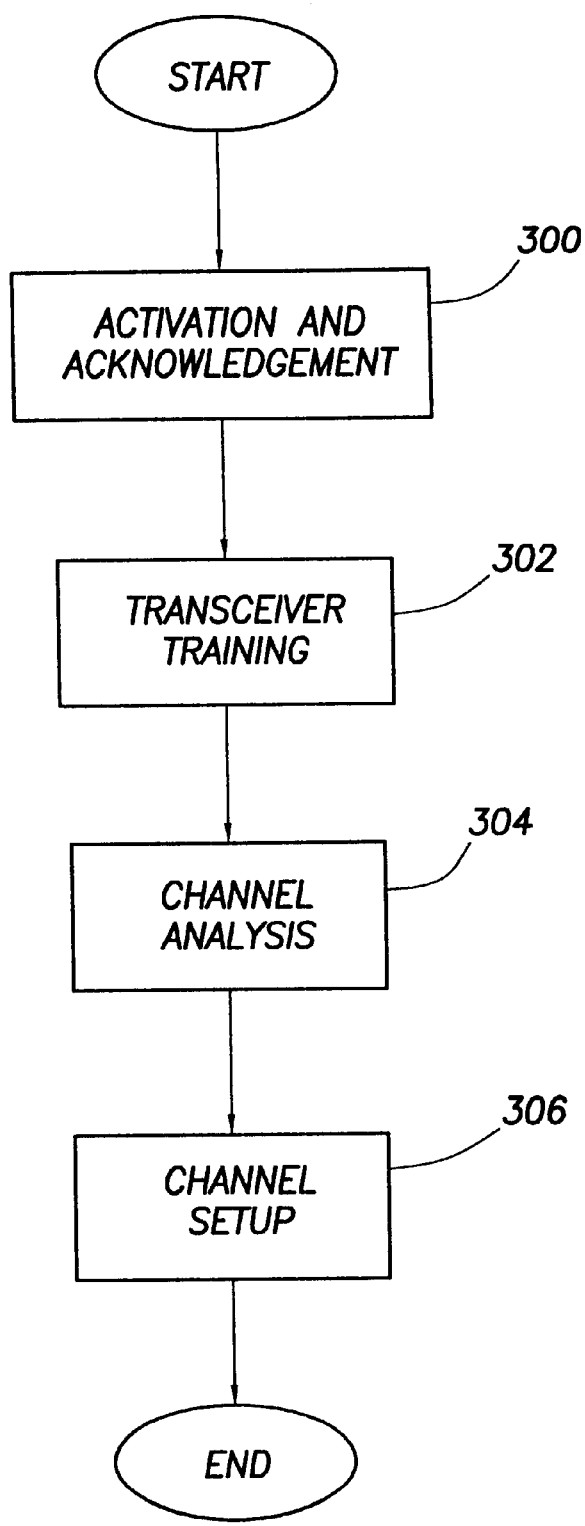
FIG. 17 shows the steps involved in training and initialization of the modems.

FIG. 17 shows the steps involved in training and initialization involved in setting up communication from the surface modem to the multiple subsurface modes. The first phase is activation and acknowledgment in block 300. At this step, each modem, both surface and subsurface, is turned on and perform initial handshaking procedures. All signals transmitted during this time are single tones at one of the sub-channel frequencies. During this phase, the subsurface modems preferably lock onto the timing signal using their respective phase locked loops. Addressing of individual modems subsurface modems must either be known ahead of time or assigned during this phase.

The second phase is transceiver training at block 302. During this phase, wideband signals are sent between the modems that allow each subsurface modem to calculate upstream and downstream received power spectral densities and to adjust automatic gain control (AGC) at each receiver prior to the analog to digital conversion. Also, the wideband signals are used to train the equalizers in each wideband receiver.

The third phase is channel analysis at block 304. During this phase, the options, capabilities and configuration information is exchanged between the surface modem and each subsurface modem.

The fourth phase is the exchange phase at block 306. In this phase, each subsurface modem decides which of the upstream and downstream options transmitted in the previous phase will be used. The subsurface modems transmit information to the surface modem which allows the surface modem to decide how to configure each subsurface modem. The surface modem decides which tones each subsurface transmitter will use and how many bits will be transmitted in each tone. The tone allocations are preferably distributed to the subsurface modems such that the assigned sub-channels are contiguous in frequency. The number of sub-channels assigned to any particular subsurface modem is dependent upon the data carrying capabilities of the twisted pair cable on a sub-channel basis. The assignment of sub-channels will have sufficient data transmission capabilities to support the amount of information to be transmitted by the individual subsurface modem. Each subsurface modem preferably is capable of transmitting on any of the 256 possible frequency bins. This capability is required based on the fact that, depending on the signal to noise ratio in each frequency bin, a particular subsurface modem could be assigned to transmit on any of the 256 possible channels.

Although the description to this point focused on gathering of seismic information, the point to multi-point communication scheme described has uses in other than seismic imaging. Indeed, any situation where data needs to be sent from a plurality of locations that can be interconnected by a twisted pair cable could benefit from the disclosure herein. For example, the multi-point to point system described could be used in wireline logging where multiple tools are lowered into a well bore to take measurements related to parameters downhole. The following claims should be read to encompass all such variations fitting within their meaning.

The above discussion is meant to be illustrative of the principles and various embodiments of the present invention. Numerous variations and modifications will become apparent to those skilled in the art once the above disclosure is fully appreciated. For example, this disclosure has referred to transmission of data in both an upstream and downstream direction with reference to sensor installation in a borehole; however, one of ordinary skill in this are will realize the high speed data communication system disclosed would work equally well in any application where the functionality of the multi-point to point communication is desired. It is intended that the following claims be interpreted to embrace all such variations and modifications.

What is claimed is:

1. A method comprising:
synchronizing data transmissions on a common transmission medium from a plurality of subsurface modems to a single surface modem, with each subsurface modem broadcasting in a corresponding frame period a sub-frame of discrete frequencies to create a super-frame for receipt by the surface modem in a single frame period, wherein the super-frame includes all the discrete frequencies in a band of frequencies during that frame period; the synchronizing taking place on substantially all the subsurface modems before the broadcasting of any one of the plurality of subsurface modems by
calculating a phase delay for each subsurface modem;
delaying in time an initial sub-frame transmission of each subsurface modem proportionate to each subsurface modem's calculated phase delay parameter; thereby
synchronizing arrival at said surface modem of each of the sub-frames sent by the subsurface modems to create a substantially synchronized super-frame.

2. A method comprising;
synchronizing data transmissions on a common transmission medium from a plurality of known subsurface modems to a single snrfae modem, with each subsurface modem broadcasting in a corresponding frame period a sub-frame of discrete fequencies to create super-frame for receipt by the surface modem in a single frame period, wherein the super-frame includes all the discrete frequencies in a band of fequencies during that frame period; the synchronizing taking place before the broadcasting by
calculating a phase delay for each subsurface modem, comprising;
sending a timing signal from the surface modem to each subsurface modem during a training phase;
returning the timing signal from each subsurface modem to the surface modem; and
calculating said phase delay for each subsurface modem based on the round trip time of the timing signal for each subsurface modem;
delaying in time an initial sub-frame transmission of each subsurface modem proportionate to each subsurface modem's calculated phase delay parameter; thereby
synchronizing arrival at said surface modem of each of the sub-frames sent by the subsurface modems to create a substantally synchronized super-frame.

3. The method as defined in claim 1 wherein delaying in time the transmission of each subsurface modem further comprises programming each subsurface modem with each subsurface modem's respective phase delay parameter.

4. A method comprising:
synchronizing data transmissions on a common transmission medium from a plurality of known subsurface modems to a single surface modem, with each subsurface modem broadcasting in a corresponding frame period a sub-frame of discrete frequencies to create a super-frame for receipt by the surface modem in a sngle frame period, wherein the super-frame includes all the discrete frequencies in a band of frequencies during that frame period; the synchronizing taking place before the broadcasting by
calculating a phase delay for each subsurface modem;
delaying in time an initial sub-frame transmission of each subsurface moderm proportionate to each subsurface modem's calculated phase delay parameter comprising;
broadcasting a continuous timing signal by said surface modem; and
transmitting data in each frame period with each frame period having a frequency of said continuous timing signal and said transmitting by each subsurface modem initially delayed in time such that each sub-frame transmitted by each subsurface modem has a phase relationship proportional to each subsurface modem's calculated phase delay;
synchronizing arrival at said surface modem of eah of the sub-frames sent by the subsurface modems to create a substantially synchronized super-frame.

5. A method of high speed digital data communications from multiple distributed modems to a single central modem over a common transmission medium, the method comprising:

dividing an available bandwidth of the common transmission medium into discrete frequency sub-channels;

analyzing a data transmission rate for each of the discrete frequency sub-channels;

allocating at least one of said discrete frequency sub-channels to each of said distributed modems;

creating a super-frame of transmitted data by having each of said distributed modems transmit only in their respective allocated sub-channels such that each distributed modem creates a sub-frame of the overall super-frame and all the distributed modems transmitting simultaneously in a frame period create the super-frame; and wherein creating the super-frame further comprises creating a cyclic prefix and a cyclic suffix by allowing only one of said distributed modems to transmit at least one of a cyclic prefix and cyclic suffix in addition to data transmission in its respective allocated sub-channels.

6. A structure for high data rate communication in seismic detection systems, comprising:

a surface modem adapted to receive data in super-frames that include discrete frequencies within a range of frequencies;

a plurality of known subsurface modems adapted to transmit data in super-frames to said surface modem over a common transmission medium;

each of said subsurface modems associated with a down hole measurement device, each down hole measurement device adapted to take readings and create measurement data;

said surface modem adapted to calculate a phase delay representing a propagation time for each of the plurality of subsurface modems, said surface modem adapted to communicate the respective phase delay to each of the plurality of subsurface modems over the common transmission medium;

each of the plurality of subsurface modems adapted to delay the transmission of its respective measurement data based on the phase delay such that each sub-frame data transmission from each of the subsurface modems arrives at the surface modem substantially simultaneously; and each of said subsurface modems further adapted to transmit its respective measurement data over the common transmission medium to the surface modem with each transmission from each subsurface modem being on a distinct subset of the discrete frequencies in the range of frequencies.

7. The structure as defined in claim 6 wherein the common transmission medium further comprises a twisted pair cable.

8. The structure as defined in claim 6 wherein each down hole measurement device associated with each subsurface modem further comprises a three axis seismic sensor.

9. The structure as defined in claim 6 further comprising:

multiple common transmission mediums with each common transmission medium coupling a plurality of subsurface modems; and said surface modem adapted to communicate to and receive data from each of said subsurface modems over each subsurface modem's respective common transmission medium.

10. The structure as defined in claim 9 wherein the multiple common transmission mediums each comprise a twisted pair cable.

11. The structure as defined in claim 10 wherein the multiple twisted pair cables forming the multiple common transmission mediums are bundled within a single cable jacket.

12. The structure as defined in claim 10 wherein there are five twisted pair cables.

13. The structure as defined in claim 9 wherein each down hole measurement device associated with each subsurface modem further comprises a three axis seismic sensor.

14. A method of simultaneous communication from multiple subsurface modems to a surface modem through a common transmission medium comprising:

coupling each of said subsurface modems to said common transmission medium; and within each subsurface modem driving a first conductor of said common transmission medium with a secondary winding of a transformer;

driving a second conductor of said common transmission medium with a secondary winding of the transformer, and wherein the secondary winding driving the first conductor and the secondary winding driving the second conductor are different windings; and thereby mixing the transmitted signals of each of the multiple subsurface modems to create a composite signal received by said surface modem.

15. The method as defined in claim 14 wherein coupling each subsurface modem and driving conductors of the common transmission medium by each subsurface modem further comprises coupling by use of a transformer having a single primary winding and two secondary windings, said secondary windings arranged and constructed such that each secondary winding has induced upon it a voltage of like amplitude and frequency as between the two windings, but differing by 180° in phase relationship.

* * * * *